Jan. 5, 1954     W. A. HARPER ET AL     2,664,759
CLUTCH ARRANGEMENT FOR SIDE DELIVERY RAKES
Filed June 29, 1950     2 Sheets-Sheet 2
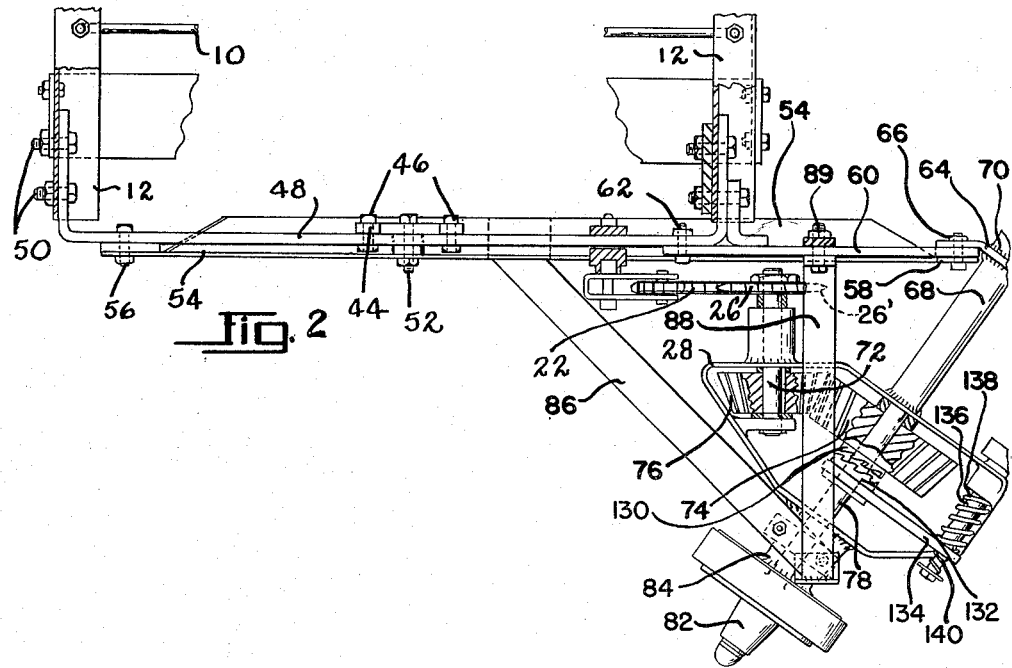
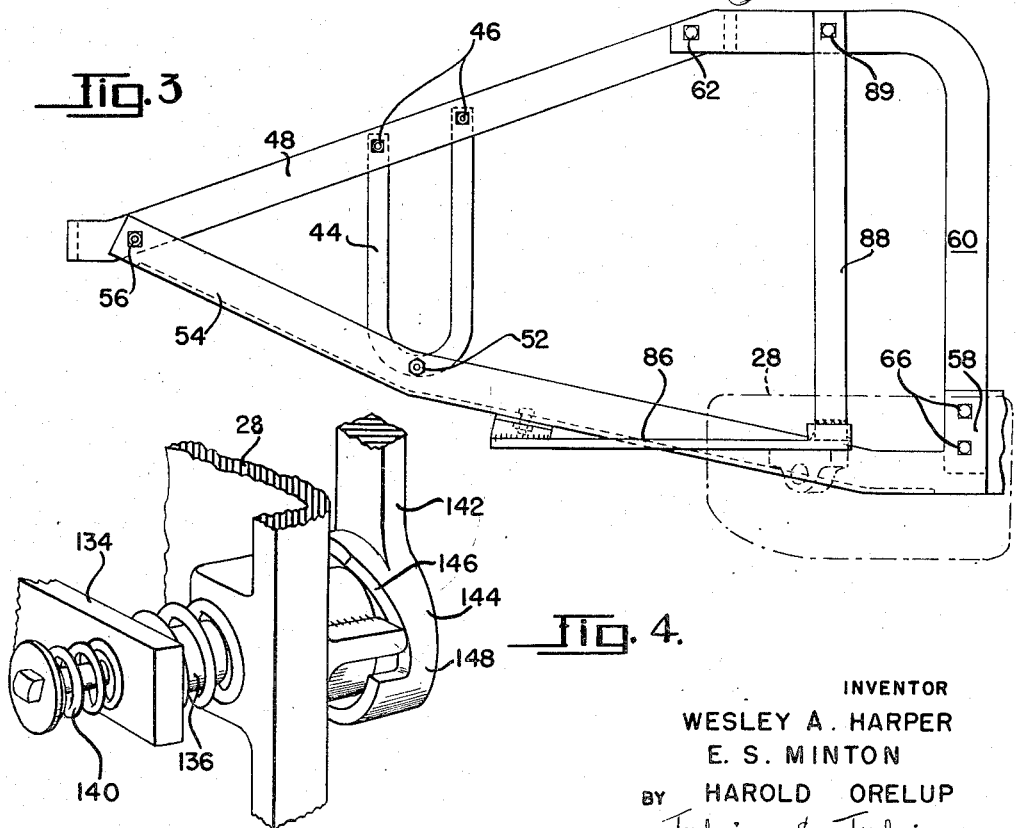
INVENTOR
WESLEY A. HARPER
E. S. MINTON
BY HAROLD ORELUP
Toulmin & Toulmin
ATTORNEYS Patented Jan. 5, 1954

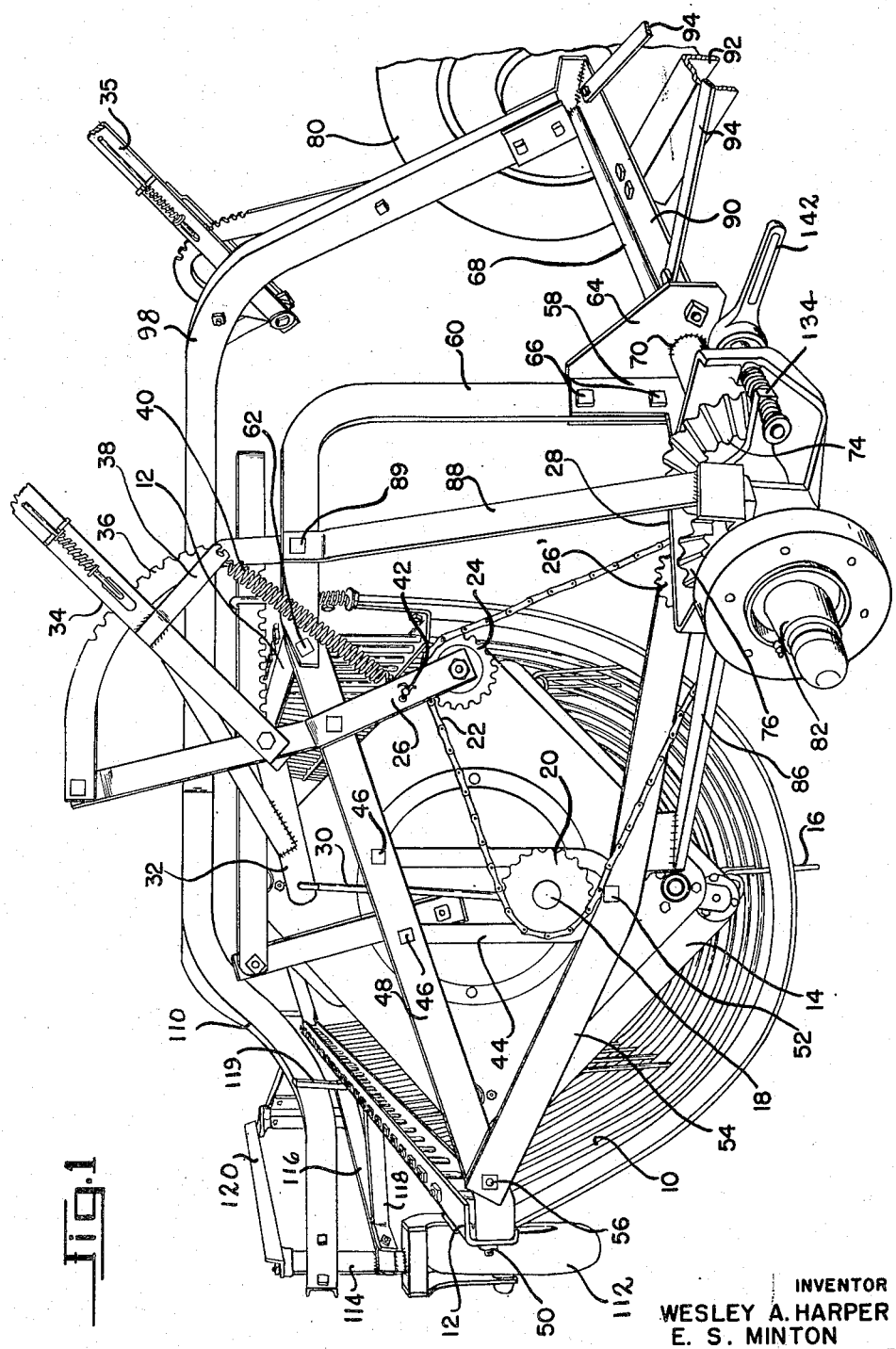

2,664,759

UNITED STATES PATENT OFFICE 2,664,759

CLUTCH ARRANGEMENT FOR SIDE DELIVERY RAKES

Wesley A. Harper, Eugene S. Minton, and Harold Orelup, Bellevue, Ohio, assignors to National Farm Machinery Cooperative, Inc., Bellevue, Ohio, a corporation of Ohio Application June 29, 1950, Serial No. 171,091

3 Claims. (Cl. 74—405)

This invention relates to side delivery rakes and the like, and particularly to a clutch arrangement for driving the reel of a side delivery rake.

A side delivery hay rake such as this invention relates to includes a reel and a reel frame which are supported diagonally within the main rake frame while the rake is drawn across a field. The hay is rolled up toward the front of the reel frame by rotation of the reel and is deposited in a windrow at the trailing end of the reel frame. It will be evident that an arrangement of this type will impose loads on the rake frame which are directed generally diagonally thereto and because of which frames were formerly made quite heavy and with a number of braces. Rakes according to the prior art were also somewhat cumbersome and not easy to manipulate in going over a field. A particular point of weakness in the frames of many such rakes is to be found in the clutch by which the reel is driven by the ground wheels of the rake.

Having the foregoing in mind, the particular object of the instant invention is to provide a frame for a rake of this nature which is light but which at the same time is adequate for sustaining all of the loads imposed on the rake during operation, including the load of driving the reel of the rake.

Another object of this invention is the provision of a novel end framing construction for supporting the reel and the reel frame, and the reel drive clutch of the rake on the main rake frame.

It is also an object of this invention to provide a framing construction for a side delivery rake wherein the loads imposed by driving the reel of the rake are all confined within the rake frame at the leading end of the reel frame.

It is also an object to provide a novel clutch mechanism by means of which the reel of the rake can selectively be driven or made idle.

These and other objects and advantages will become more apparent upon reference to the following description taken in connection with the accompanying drawings in which:

Figure 1 is a perspective view of a side delivery rake constructed according to our invention.

Figure 2 is a plan view looking down on the rake at the leading end of the reel cage.

Figure 3 is an end view looking at it the same end as Figure 2 shows.

Figure 4 is a perspective view showing a clutch and actuator according to this invention.

Referring to the drawings somewhat more in detail, a side delivery rake of the nature with which this invention is concerned comprises a reel and a reel cage. The reel cage within which the reel is rotatably mounted, comprises the arcuate stripper rods as at 10 which are supported in a frame consisting of the longitudinally extending front and back channel members 12 by having their ends extending through the channel members and clamped thereto by nuts threaded on the rods. The combination of the channel members 12 and the stripper rods 10 forms a generally semi-cylindrical enclosure or cage wtihin which the reel of the rake runs when the rake is in operation.

The reel of the rake within the cage comprises the end plates 14 between which are mounted shafts having tines 16 that project outwardly between the stripper rods 10 as the reel turns within its cage. The reel is mounted eccentrically with the cage and is adapted for being driven by a shaft 18 having a sprocket 20 over which runs drive chain 22. The eccentric mounting of the reel causes the tines 16 to push the material being raked forwardly of the cage and then to withdraw from the material. Drive chain 22 passes over idler 24 that is supported on pivoted arm 26, and also passes over a drive sprocket 26 that is mounted on a shaft extending into a gear box 28.

The reel is adapted for being raised and lowered by means of a rod 30 that connects with a hanger bearing about shaft 18 rearwardly of sprocket 20. Rod 30 is connected with arm 32 of an adjustable lever 34 that is movable over the notched quadrant 36. Lever 34 also has an arm 38 to which one end of spring 40 is anchored, the other end of the said spring connecting with arm 26 as at 42. This arrangement is such that as the reel is raised and lowered by movement of lever 34 the position of the stationary anchor of spring 40 is adjusted so that the idler 24 bears against chain 22 with substantially the same thrust at all times. The trailing end of the reel is similarly vertically adjustable in the cage by lever 35 so the reel can be positioned at the proper vertical angle for the most efficient operation. The hanger bearing previously referred to as being behind sprocket 20 is slidable within a U-shaped frame member 44 that has the upper end of its two legs connected as by the bolts 46 with a first bar 48 extending between the front and back frame members 12 of the reel frame. The ends of bar 48 are bent inwardly and bolted to the channel members 12 as by the bolts 50.

The lower end of U-shaped member 44 is secured by a bolt 52 to another frame member 54 bolted to bar 48 at 56 and having its forward end bent up as will be seen at 58 in Figures 1 and 3. The upstanding end part 58 of member 54 is connected with another frame member in the form of a second bar 60 that extends vertically upward and then is bent back to be bolted at 62 to the forward end of bar 48. Member 54 is advantageously formed of an angle and is thereby made quite stiff, but, due to the location and the stresses imposed on members 48 and 60, it has been found satisfactory to form these elements of relatively heavy bar stock.

The lower end of member 60 and the upturned end 58 of member 54 are bolted together and to an angular bracket 64 by bolts 66. Angular bracket 64 is rigidly secured to the front axle assembly which comprises an axle housing 68 as by means of the welding indicated at 70. As will best be seen in Figures 1 and 2 the axle assembly comprises the gear box housing 23, previously referred to, integral with the said housing and within which are mounted the bevel gears 74 and 76. Gear 76 is keyed to a shaft 72 that extends out one wall of the housing and mounts sprocket 26'.

The front axle assembly also comprises the shaft 78 that extends through the axle housing and gear box housing and which mounts on its opposite ends the ground wheels 80 having the hub parts 82. The hub part 82 adjacent the gear box housing 72 is mounted on the projecting part 84 secured to the said gear box housing and forming an extension or continuation of the axle housing 68.

The projection 84 is connected by a diagonally extending brace element 86 with an intermediate point on member 54 and in this manner the outer end of the axle assembly is braced against deflecting under load and draft can be transmitted to the member 54 when the rake is in operation.

In order to stiffen the end frame structure and the axle assembly against bending relatively in a vertical plane, there may also be the upward and diagonally extending brace element 88 which is connected at its lower end with the projecting portion 84 in substantially the same place as the brace element 86, and at its upper end to frame member 60 by bolt 89.

As will be seen in Figure 1, the front axle assembly comprises a transverse plate or beam 90 to which is connected the draft member 92 and the braces 94, the arrangement being such that a tractor or the like can be connected to the leading end on draft member 92 for pulling the rake over the ground.

Figure 1 will also show that the end of the front axle assembly opposite the gear box housing 23 has connected therewith, as by means of the bracket plate 96, a first elongated structural member 98 extending generally in the direction of travel of the rake. This structural element may comprise an angle or a channel and is formed as to extend upwardly from the front axle assembly then backwardly over the top of the reel and reel cage and then downwardly at the back of the rake. At the rear end of member 98 there is mounted the caster type ground wheel adapted for swiveling about the axis of its supporting shaft. Brace bars are provided which rigidly hold the reel cage and the rear end of structural member 98 in a predetermined position of alignment.

The front channel member 12 of the reel frame is secured to member 98 as by bolts or welding and this provides support for the reel frame on the said member.

Somewhat rearwardly along member 98 from its connection with member 108 is a second elongated structural element 110 which may also be an angle or channel, and which has its forward end rigidly connected with member 98 and its rear end bent downwardly and rearwardly to provide support for a second caster type ground wheel 112 which is also provided with a shaft 114 as described in connection with caster wheel 109. The sleeve within which the shaft 114 of caster wheel 112 turns is also connected with the rear part of the reel frame as by the diagonally extending brace bars 116 and 118 which are connected with the said sleeve below its connection with the rear end of structural member 110 whereby the caster wheel assembly is supported during operation of the rake.

There may advantageously be provided a support bracket as at 119 connected with the rear channel member 12 of the reel frame that extends upwardly and is connected with structural member 110 for providing support for the rear part of the reel frame.

An additional brace element represented by angle 120 may extend between the caster wheels and, as illustrated may advantageously be pivotally connected with arms 122 secured to the upper ends of the caster wheel shafts so that the angle 120 not only supports the caster wheel assemblies, but also insures that the caster wheels pivot in unison.

Returning now to the gear box assembly previously referred to, the gear 74 therein is mounted on shaft 78 for free rotation but comprises a clutch half 130 adapted for engagement with clutch half 132 that is splined or otherwise slidably keyed to shaft 78. An arm 134 rotatably connected with clutch half 132 extends therefrom and slidably receives the shifting shaft 136. A first spring 138 bears between arm 134 and the wall of gear box housing 72 and a second spring 140 bears between a washer secured to the end of shaft 136 and the other side of arm 134. Reference to Figure 6 will reveal that the shaft 136 extends outwardly through one wall of the gear box housing 72 and has mounted thereon a lever 142 having a cam part 144 at its lower end comprising the incline 146 engageable with a rib or abutment 148 stationary on the wall of the gear box housing. By rotating lever 142 through substantially 90°, the shaft 136 can be reciprocated thereby to move arm 134 in the direction of the length of shaft 78 and bring clutch half 132 selectively into or out of engagement with clutch half 130 on gear 74. It will be evident that the spirngs 138 and 140 provide means whereby the lever 142 can be shifted its full amount even though the teeth of the clutch halves do not exactly engage. Furthermore, due to the fact that the clutch half 132 is resiliently held against clutch half 130, the clutch mechanism has a ratchet action so the rake can be backed up when necessary and the reel will not be driven in the reverse direction.

It will be understood that this invention is susceptible to modification in order to adapt it to different usages and conditions, and, accordingly, it is desired to comprehend such modifications within this invention as may fall within the scope of the appended claims.

We claim:

1. In a rake of the type described; a tubular axle structure comprising a housing having a gear box portion integral therewith adjacent one end, an axle traversing said housing and gear box, a first bevel gear in the gear box on the axle, a second bevel gear in the box meshing with the first gear and having a shaft extending through one wall of the gear box to mount a sprocket, a one-way clutch member slidable on the axle for selectively connecting the first gear with the axle, a shifter arm on the clutch member, a rod traversing the arm parallel to the axle, a lever fixed on the rod outside the gear box having a cam surface engaging the gear box so shifting of the lever about the axis of the rod will reciprocate said rod, a first spring bearing on said arm to urge it toward clutch disengaged position, and a second spring bearing between the rod and the arm to urge the arm toward clutch engaged position.

2. In a rake of the type described; a tubular axle structure comprising a housing having a gear box portion integral therewith adjacent one end, an axle traversing said housing and gear box, a first bevel gear in the gear box on the axle, a second bevel gear in the box meshing with the first gear and having a shaft extending through one wall of the gear box to mount a sprocket, a one-way clutch member slidable on the axle for selectively connecting the first gear with the axle, a shifter arm on the clutch member, a rod traversing the arm parallel to the axle, a lever fixed on the rod outside the gear box having a cam surface engaging the gear box so shifting of the lever about the axis of the rod will reciprocate said rod, a first spring bearing on said arm to urge it toward clutch disengaged position, and a second spring bearing between the rod and the arm to urge the arm toward clutch engaged position, said rod comprising a shoulder against which the said bar is normally held by said second spring.

3. An arrangement as set forth in claim 2 in which the said clutch member rotates on said first gear in the reverse direction of rotation of said axle.

WESLEY A. HARPER.
EUGENE S. MINTON.
HAROLD ORELUP.

References Cited in the file of this patent

UNITED STATES PATENTS

| Number | Name | Date |
|---|---|---|
| 1,240,451 | Holtvigt | Sept. 18, 1917 |
| 1,283,474 | Dain | Nov. 15, 1918 |
| 1,285,963 | Estep | Nov. 26, 1918 |
| 1,448,812 | Mowry et al. | Mar. 20, 1923 |
| 1,746,968 | Ross | Feb. 11, 1930 |
| 2,175,088 | Oppenheim et al. | Oct. 3, 1939 |
| 2,336,117 | Moschel et al. | Dec. 7, 1943 |
| 2,459,379 | Hanson | Jan. 18, 1949 |
| 2,514,561 | Scranton | July 11, 1950 |
| 2,518,389 | Sisulak | Aug. 8, 1950 |